(12) United States Patent
Alessandro et al.

(10) Patent No.: US 9,735,599 B2
(45) Date of Patent: Aug. 15, 2017

(54) BATTERY CHARGER INCLUDING CORRECTION DEVICE TO CORRECT CONTROL SIGNALS FOR SUPPLY SWITCHING CIRCUIT

(71) Applicant: STMicroelectronics S.r.l., Agrate Brianza (IT)

(72) Inventors: Agatino Antonino Alessandro, Riposto (IT); Carmelo Alberto Santagati, Tremestieri Etneo (IT); Liliana Arcidiacono, Tremestieri Etneo (IT); Francesco Pirozzi, Gravina di Catania (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 180 days.

(21) Appl. No.: 14/725,506

(22) Filed: May 29, 2015

(65) Prior Publication Data

US 2015/0380966 A1    Dec. 31, 2015

(30) Foreign Application Priority Data

Jun. 30, 2014    (IT) ................ MI2014A1187

(51) Int. Cl.
*H01M 10/44*    (2006.01)
*H01M 10/46*    (2006.01)
*H02J 7/00*    (2006.01)
*G01R 31/36*    (2006.01)

(52) U.S. Cl.
CPC ........ *H02J 7/0052* (2013.01); *G01R 31/3655* (2013.01); *H01M 10/44* (2013.01)

(58) Field of Classification Search
CPC .............................. H02J 7/0021; H02J 7/0047

USPC ........ 320/107, 128, 132, 141, 149, DIG. 18, 320/DIG. 21; 340/636.2
See application file for complete search history.

(56) References Cited

U.S. PATENT DOCUMENTS

| 2009/0027056 A1* | 1/2009 | Huang ................ B60L 11/1857 320/132 |
| 2009/0146826 A1* | 6/2009 | Gofman ............. A61B 5/14532 340/636.2 |
| 2011/0012554 A1 | 1/2011 | Lin et al. |

FOREIGN PATENT DOCUMENTS

WO    WO-2010096709 A2    8/2010

OTHER PUBLICATIONS

Italian Search Report and Written Opinion for IT MI2014A001187 dated Mar. 2, 2015 (6 pages).

* cited by examiner

*Primary Examiner* — Edward Tso
(74) *Attorney, Agent, or Firm* — Gardere Wynne Sewell LLP

(57) ABSTRACT

A battery charger includes an input supply terminal configured to receive a supply signal and a battery terminal configured to be connected to a battery. A supply switching circuit is arranged between the battery terminal and the input supply terminal. A control device generates a control signal to control operation of the supply switching circuit. A fuel gauge device provide a digital estimation of a voltage signal across the battery. A correction device modifies the control signal in response to the digital estimation of the voltage signal across the battery if that digital estimation is outside of a value range between two thresholds.

10 Claims, 4 Drawing Sheets

BATTERY CHARGER INCLUDING CORRECTION DEVICE TO CORRECT CONTROL SIGNALS FOR SUPPLY SWITCHING CIRCUIT

PRIORITY CLAIM

This application claims priority from Italian Application for Patent No. MI2014A001187 filed Jun. 30, 2014, the disclosure of which is incorporated by reference.

TECHNICAL FIELD

The present invention relates to a battery charger.

BACKGROUND

Nowadays a mobile phone, digital camera, notebook, netbook, tablet etc. has become daily used electronic device. The power of the batteries of these electronic devices decides the length of time of use of the electronic device. Electronic devices such as a mobile phone, digital camera, notebook, netbook, tablet etc. must be used with corresponding battery chargers. Generally, these battery chargers (or called as power supplies) are unique to the corresponding electronic devices.

Typically, each battery charger is provided with an input terminal, such as a USB terminal, for the connection to the power line for charging the battery and simultaneously powering the device connected to the battery. FIG. 1 shows a battery charger 1 having an input terminal Vline connectable to a supply voltage and an output terminal connectable to a battery unit 2; the supply circuit 3 of the battery charger 1 which provides the current Ibat to the battery unit 2 may be controlled by one among the different regulation loops: input voltage loop IVL, input current loop ICL, thermal loop TL, current battery loop CBL, battery voltage loop BVL.

Usually, the battery charger is used to manage energy flowing from the input source Vline into the battery unit 2, regulating the charging current according also to the voltage level of the battery. In particular, when the battery voltage reaches the programmed floating voltage level (VFLT) the charge is stopped and the current Ibat flowing from the battery charger to the battery unit 2 is interrupted as consequence. Floating voltage accuracy is crucial for the battery lifetime and for safety reason as well. Some chargers also implement other control loops in the same chip able to limit the input current or to regulate the charging current in reason of the input voltage level or the silicon temperature. Generally, the PWM control signal is results of the combination of those loops.

A typical charging profile is shown in the FIG. 2. Two main charging phases are clearly identified; a first charging phase wherein the current Ibat is kept constant while the voltage Vbat rises, and a second charging phase wherein the voltage Vbat is kept constant and the current Ibat goes down to the level Iterm.

Until the battery voltage is below the VFLT voltage level, the current Ibat flowing into the battery is kept constant by a current loop regulation. This phase is named constant current (CC).

The charging current regulation during CC phase can be the combination of different regulation loops (input voltage loop IVL, input current loop ICL, thermal loop TL, current battery loop CBL, etc) one at a time. So, the charging current level during CC change can vary as consequence, as shown in FIG. 2 wherein the three charging current levels are present Itrk during the trickle-charge TRK, Ipre during the pre-charge PRE after the trickle-charge and Ifast during the fast charge FAST after the pre-charge.

Once the battery voltage Vbat is close to the level VFLT, the current starts to decrease and the regulation is taken by the battery voltage loop BVL. This phase is named constant voltage (CV).

Usually, the CV phase comprises the phase TAPER which ends when current Ibaty into the battery reaches the current threshold Iterm. After that, the end of charge (EOC) is reached and the charger is switched in off state OFF.

There are known in the state of the art control circuits, so called "Fuel Gauge", to provide an estimation of the charging level of the battery.

The use of the Fuel Gauge during charging can assure estimation of the battery charging level with high precision (~0.1%). Typically, the accuracy is achieved by means of an analog to digital converter and a sigma delta modulator that provides the mean value of the voltage level with a rate of few milliseconds. The Fuel Gauge and the battery charger operate separately.

However, the introduction of a fuel gauge circuit causes an increase of the silicon area.

SUMMARY

One aspect of the present disclosure is to provide a battery charger with a high accuracy.

One aspect of the present disclosure is a battery charger comprising an input supply terminal configured to receive a supply signal, a battery terminal configured to be connected to a battery, a supply switching circuit arranged in the electrical path between the battery terminal and the input supply terminal, a control device configured to generate the control signal of the supply switching circuit, wherein the battery charger comprises a fuel gauge device configured to provide a digital estimation of the voltage signal across the battery, a correction device configured to modify said control signal emitted from the control device if said digital estimation of the voltage signal across the battery is out of a value range comprises between a first threshold and a second threshold with the first threshold lower than the second threshold.

BRIEF DESCRIPTION OF THE DRAWINGS

For a better understanding of the present disclosure, a preferred embodiment thereof is now described, purely by way of non-limiting example and with reference to the annexed drawings, wherein.

DETAILED DESCRIPTION

Figure 1:
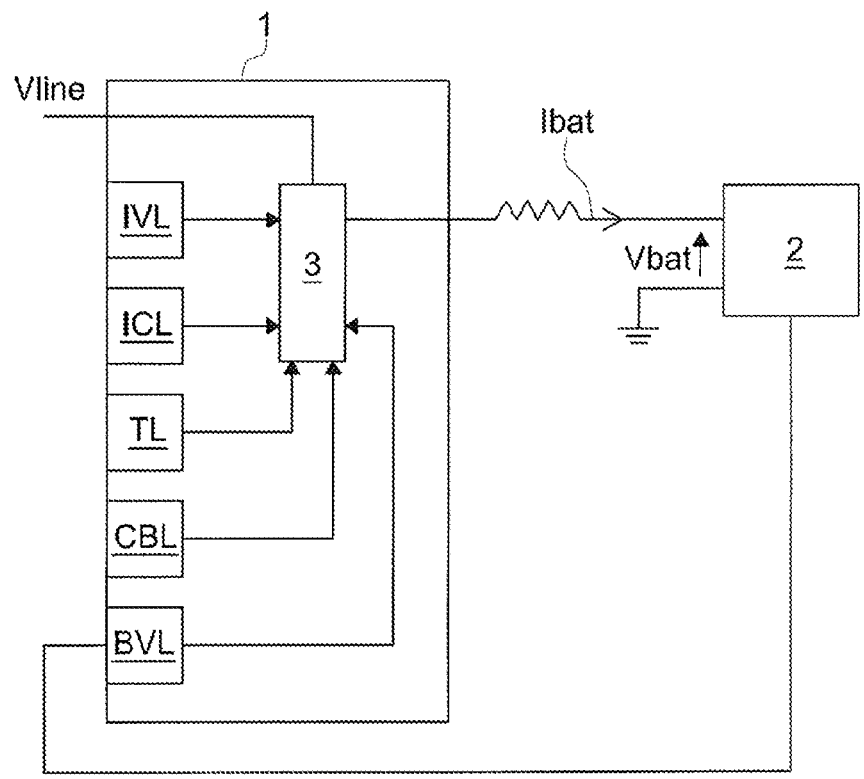
FIG. 1 shows a battery charger according to prior art.
Figure 2:
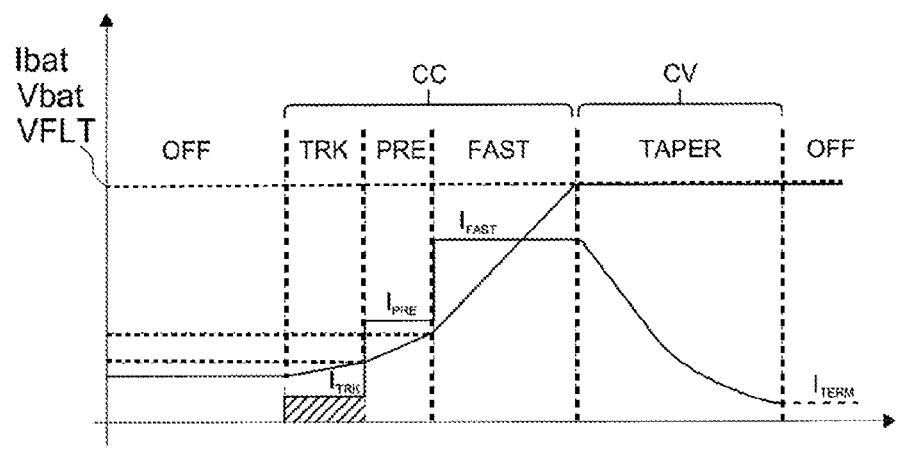
FIG. 2 shows the waveforms of the current and voltage during the charge of a battery.
Figure 3:
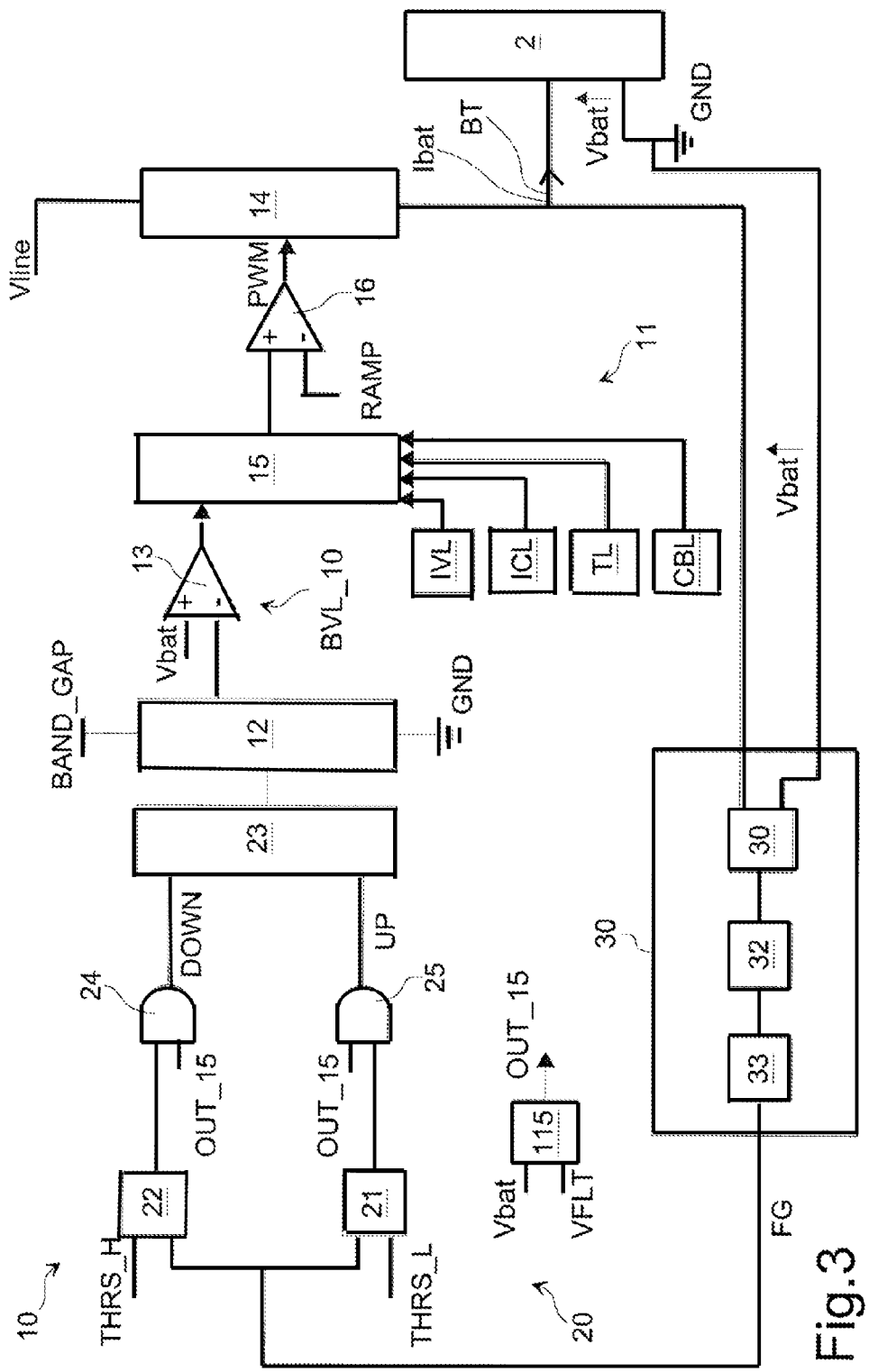
FIG. 3 shows a battery charger according to one embodiment of the present disclosure.

A battery charger device according to one embodiment of the present disclosure is shown in FIG. 3.

The battery charger 10 comprises an input supply terminal Vline, for example a USB terminal, configured to receive a supply signal Vdd, a battery terminal BT configured to be connected to a battery 2, and a supply switching circuit 14 controlled by a control block 11 and configured to receive the supply signal Vdd via the input supply terminal Vline and configured to supply the battery 2 with the current Ibat.

The supply switching circuit 14 preferably comprises a half-bridge circuit with a high side transistor and a low side transistor and with an impedance comprising an inductance and a capacitance in parallel to the low side transistor. The supply switching circuit 14 is controlled with a pulse width modulation signal PWM output from the control block 11. The control signal PWM emitted by the control block 11 determines the duty-cycle of the supply switching circuit 14 as to provide a regulated current or voltage at the output.

The control block 11 comprises a comparator 13 configured to compare the feedback signal Vbat output from the battery 2 with a reference signal REF generated by a band-gap circuit 12 connected between a band-gap voltage BAND-GAP and ground GND. The comparator 13 and the band-gap circuit 12 belong to the battery voltage loop BVL_10 which controls the supply switching circuit 14 through the signal PWM in a similar way to one among the different regulation loops: input voltage loop IVL, input current loop ICL, thermal loop TL, current battery loop CBL.

The battery charger 10 comprises an analog selector 15 which is configured, in a known way, to compare the different output signals generated from the different regulation loops (input voltage loop IVL, input current loop ICL, thermal loop TL, current battery loop CBL and battery voltage loop BVL_10) and to output the signal having higher value among said different regulation loops. The output signal of the analog selector is compared at comparator 16 with the ramp signal RAMP to generate the signal PWM configured to control the switching circuit 14.

The battery charger 10 further comprises a fuel gauge device 30 to increase charging accuracy. The fuel gauge device 30, in a known way, comprises an analog to digital converter 31 having at the input the voltage Vbat between the terminal BT and ground, a sigma delta modulator 32 having at the input the output signal of the analog to digital converter 31 that provides the mean value of the voltage level with a rate of few milliseconds and a digital processor 33 to process the output signal from the sigma delta modulator 32 and to output a digital voltage signal FG which is an estimation of the battery charging level with high precision (~0.1%).

Calibration of the voltage regulation is done by synchronizing measurements coming from the fuel gauge device 30 with the analog regulation performed by the voltage loop. Since, typically, the data output from the fuel gauge device 30 is refreshed each 2 ms, the voltage regulation must be updated at the same times as well.

For this aim, the battery charger 10 according to the present disclosure comprises a digital circuit block 20 configured to determine if the voltage signal FG is inside a window of accuracy given by a lower threshold THRS_L and a higher threshold THRS_H and to modify the reference voltage REF output from circuit 12 in the case wherein the voltage signal FG is outside of said window accuracy.

The digital circuit block 20 comprises two digital comparators 21, 22 used to determine if the battery voltage FG read by the fuel gauge device 30 is within the desired accuracy window THRS_L, THRS_H and to provide two respective output signals UP and DOWN if the voltage signal FG is out of the desired accuracy window THRS_L, THRS_H. When the voltage signal FG is below the lower threshold THRS_L the signal UP at the output of the digital comparator 21 is high, while when the battery voltage signal FG is above the higher threshold of accuracy THRS_H the signal DOWN at the output of the digital comparator 22 is high.

Figure 3A:
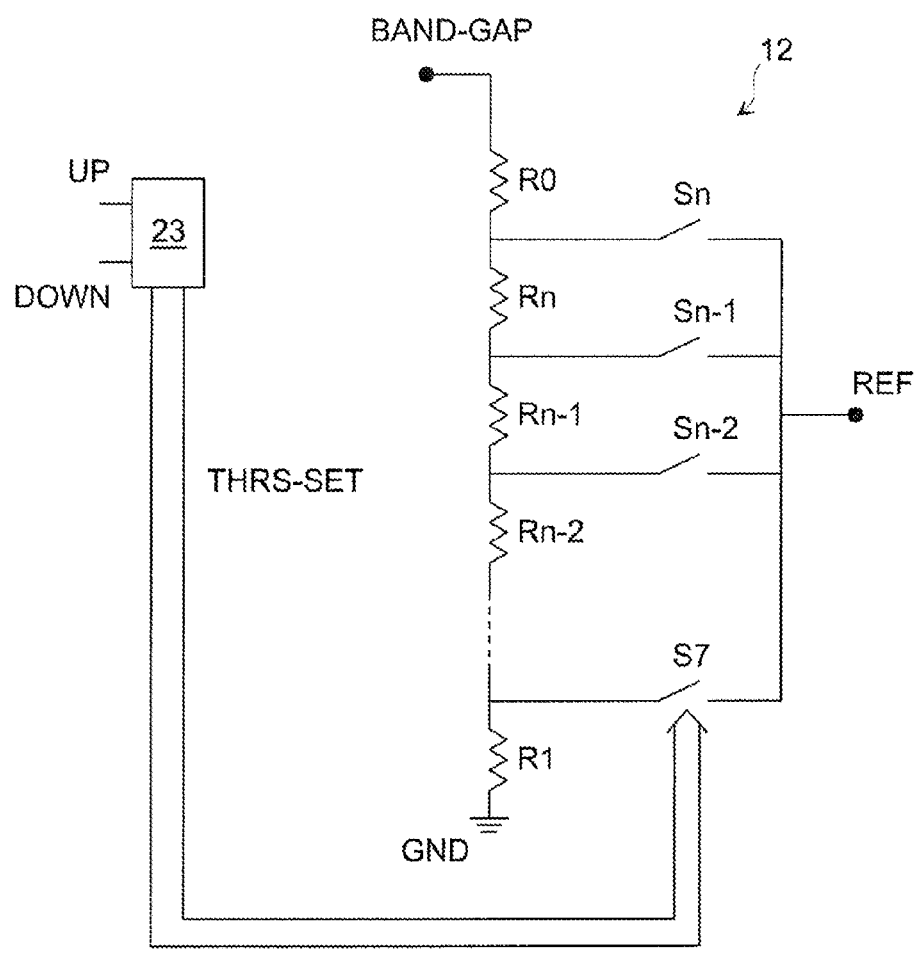
FIG. 3A shows in more detail a part of the battery charger in FIG. 3.

An up/down counter 23 receives the signals UP and DOWN deriving from the digital comparator 21, 22 and is configured to increase or decrease the reference voltage REF of the battery voltage loop using the output signal THRS-SET that controls the band-gap circuit 12. Preferably, the band-gap circuit 12, as shown in FIG. 3A, comprises a series of resistances R0 and R1 . . . Rn arranged between the band-gap voltage BAND-GAP and ground GND. A series of switches S1 . . . Sn is arranged between the respective terminal of the resistance R1 . . . Rn of the series of resistances R1 . . . Rn and the output terminal of the band-gap circuit 12. The switches S1 . . . Sn are controlled by the signal THRS-SET so that only one of the switches S1 . . . Sn is closed; preferably the signal THRS-SET is a digital signal at three bits and each switch of the series of switches S1 . . . Sn is controlled by a digital word at three bits. When the signal UP is received, the counter 13 increases the reference voltage REF, while when the signal DOWN is received, the counter decreases the reference voltage REF. Finally, if the battery voltage is above the lower threshold and below the higher threshold, the target accuracy is reached and no correction is done by the up/down counter 23. This is summarized on the following table:

| UP | DOWN | |
|----|------|---|
| 0 | 0 | no correction to be done |
| 0 | 1 | the reference voltage REF is decreased |
| 1 | 0 | the reference voltage REF is increased |
| 1 | 1 | not allowed |

The job of the counter is to limit the number of steps needed to perform the correction and managing the correction timing. In a preferred implementation, only four steps of correction are allowed (two steps for rising voltage and two steps for falling voltage) and the voltage reference REF is updated each 20 ms.

According to a variant of the embodiment of the present disclosure, the battery charger 10 comprises a circuit 115, 24, 25 configured to enable the correction of the voltage reference REF only if the battery voltage loop BVL_10 is effectively regulating the charging phase of the battery 2. The circuit 115, 24, 25 is configured to enable the up/down counter 23 only if the battery voltage loop is effectively regulating the charging phase of the battery 2.

The correction enabling circuit 115, 24, 25 comprises a circuitry 115 which, according to the variant of the embodiment of the present disclosure, is structured to be able to emit a signal OUT-15 at a high logic level, which corresponds to 1, when the battery voltage Vbat is close to the programmed floating voltage level VFLT of the battery 2, that is when the constant voltage phase CV is active, while circuitry 115 is able to emit the signal OUT-15 at a low logic level, which corresponds to 0, when the battery voltage Vbat is not close to the level VFLT, that is when the constant current phase CC is active. Preferably the circuitry 115 comprises a comparator configured to compare the voltages Vbat and VLFT and configured to emit the signal OUT-15 at a high logic level when Vbat reaches VLFT and the signal OUT-15 at a low logic level when Vbat is lower than VLFT. The signal OUT-15 is at the input of two AND gates 24, 25 having respectively at the input the signals DOWN and UP deriving from the digital comparators 22 and 21. The AND gates 24, 25 enable the counter 13 only if the signal OUT-15 is at high logic level.

In this way over-voltage, caused by load transient on battery, can be avoided.

For instance, supposing to be in constant voltage phase CV and that more current from the battery (higher than the charging current settled) is requested. In this condition the battery voltage drops. If the voltage signal FG goes below the lower threshold THRS_L, the signal UP is forced to high and the up/down counter 23 increases the voltage reference REF. In any event, the voltage battery cannot increase, because the maximum current allowed by the charger is lower than the current requested by the load. Consequently, the signal UP would remain high and the up/down counter 23 would continue to try to increase the voltage reference REF. Once the load is removed from the battery 2, the voltage reference REF would be too high, causing some over voltage on battery.

Preferably all the components of the battery charger 10, as the fuel gauge device and the control block 11, are integrated in one chip of semiconductor material.

Figure 4:
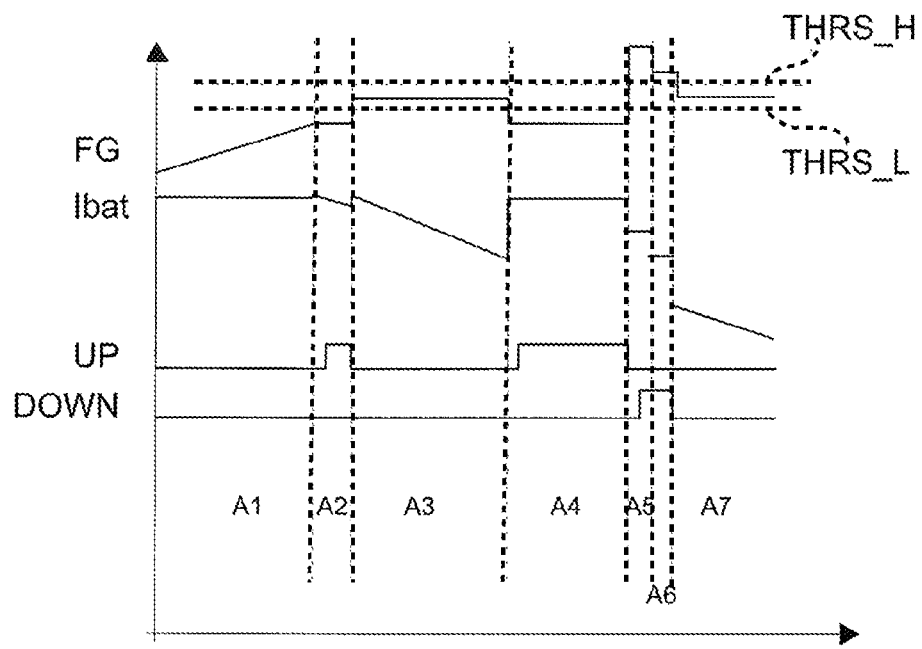
FIG. 4 shows the waveforms of some signals in play in the battery charger according to the embodiment of the present disclosure.

FIG. 4 shows the waveforms of the signal Ibat, Vbat, UP and DOWN in different charging phases of the battery with the battery charger according to the embodiment of the present disclosure. In the phase A1 the battery charger operates in the constant current phase CC and then, in the phase A2, there is the transition between the constant current phase CC to the constant voltage phase CV wherein the battery voltage FG is below the lower threshold THRS_L and the signal UP goes high and the voltage reference is increased by one step.

In the phase A3 the battery voltage FG is inside the accuracy window THRS_L, THRS_H and no correction is effectuated by the digital circuit block 20.

In the phase A4 a load transient on the battery 2 occurs; the battery voltage FG falls below the lower threshold THRS_L so that the signal UP goes high again, the voltage reference REF is increased to its maximum level, but with no effect on the voltage battery FG, because the current loop CBL is regulating the charging phase of the battery 2.

In the phase A5 the load transient on battery 2 ends; the voltage reference REF is still at its maximum level and the battery voltage FG exceeds the higher threshold of accuracy THRS_H and the signal DOWN becomes high.

In the phase A6 the battery voltage FG is even higher than the higher threshold THRS_H; the signal DOWN is high and the voltage reference REF is decreased.

In the phase A7 the battery voltage FG is again inside the accuracy window THRS_L, THRS_H and no correction is effectuated by the digital circuit block 20.

Figure 5:
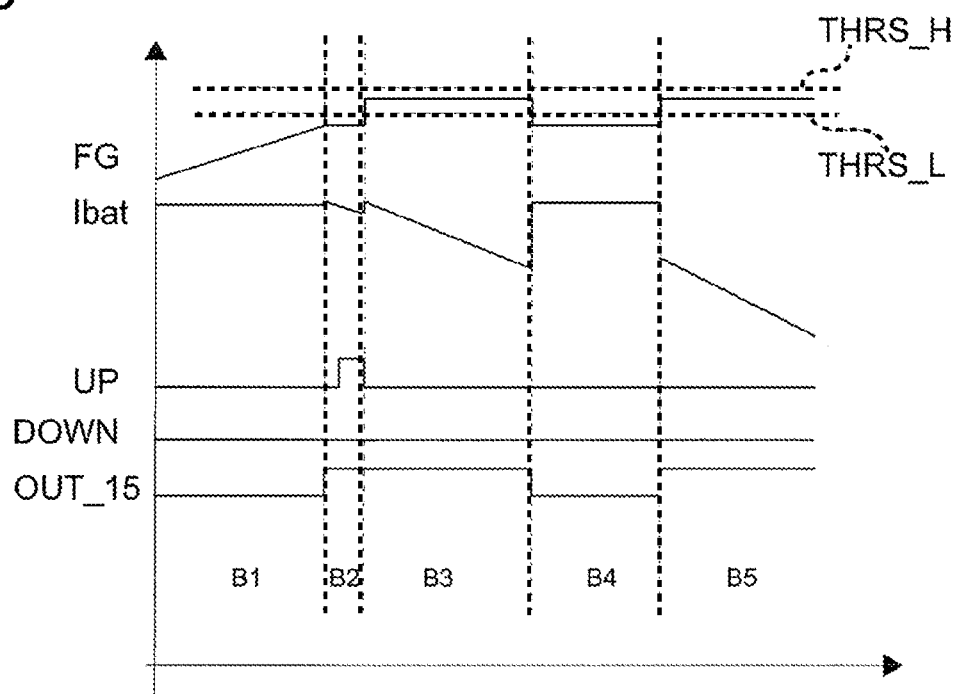
FIG. 5 shows the waveforms of some signals in play in the battery charger according to a variant of the embodiment of the present disclosure.

FIG. 5 shows the waveforms of the signal Ibat, Vbat, OUT_15, UP and DOWN in different charging phases of the battery with the battery charger according to the variant of the embodiment of the present disclosure. In the phase B1 the battery charger operates in the constant current phase CC and then, in the phase B2, there is the transition between the constant current phase CC to the constant voltage phase CV wherein the battery voltage FG is below the lower threshold THRS_L and the signal UP goes high and the voltage reference REF is increased by one step.

In the phase B3 the battery voltage FG is inside the accuracy window THRS_L, THRS_H and no correction is effectuated by the digital circuit block 20.

In the phase B4 a load transient on the battery 2 occurs; the battery voltage FG falls below the lower threshold THRS_L but, since the current loop is regulating the charging phase of the battery 2, the signal OUT_15 is at low logic level so that the counter 23 is disabled and no correction is effectuated by the digital circuit block 20.

In the phase B5 the load transient on battery 2 ends; the battery voltage FG is again inside the accuracy window THRS_L, THRS_H and no correction is effectuated by the digital circuit block 20 that, in the case, is enabled because the battery voltage loop BVL_10 is regulating the charging phase of the battery 2.

The invention claimed is:

1. A battery charger, comprising:
   an input supply terminal configured to receive a supply signal,
   a battery terminal configured to be connected to a battery,
   a supply switching circuit arranged in an electrical path between the battery terminal and the input supply terminal,
   a fuel gauge device configured to provide a digital estimation of a voltage signal across the battery,
   a control device configured to generate a control signal to control operation of the supply switching circuit, in response to a difference between the digital estimation of the voltage signal across the battery and a reference signal, and
   a correction device configured to modify said control signal generated by the control device if said digital estimation of the voltage signal across the battery is out of a value range between a first threshold and a second threshold by modifying the reference signal, wherein the first threshold is lower than the second threshold.

2. The battery charger according to claim 1, wherein said correction device is configured to increase the reference signal if said digital estimation of the voltage signal across the battery is lower than the first threshold and configured to decrease the reference signal if said digital estimation of the voltage signal across the battery is higher than the second threshold.

3. The battery charger according to claim 2, wherein said correction device comprises:
   a first digital comparator configured to compare said digital estimation of the voltage signal across the battery with the second threshold, and
   a second digital comparator configured to compare said digital estimation of the voltage signal across the battery with the first threshold,
   an up/down counter configured to increase by one step if an output signal of the second digital comparator is in an active logic state and to decrease by one step if an output signal of the first digital comparator is in the active logic state.

4. The battery charger according to claim 1, wherein the battery charger comprises an enabling circuit of the correction device configured to enable the correction device only when a charging phase of the battery is operating at a constant voltage phase.

5. The battery charger according to claim 4, wherein the enabling circuit of the correction device comprises a comparison circuit configured to compare the voltage across the battery with a programmed floating voltage level of the battery,
   said comparison circuit configured to emit a signal at an active logic state when the voltage across the battery is close to the programmed floating voltage level of the battery.

6. A method of operating a battery charger, wherein the battery charger includes an input supply terminal configured to receive a supply signal, a battery terminal configured to be connected to a battery, and a supply switching circuit arranged in an electrical path between the battery terminal and the input supply terminal, the method comprising:
controlling said supply switching circuit,
generating a digital estimation of a voltage signal across the battery,
wherein the controlling is effectuated in response to a difference between the digital estimation of the voltage signal across the battery and a reference signal,
modifying the controlling of the supply switching circuit if said digital estimation of the voltage signal across the battery which is outside of a value range between a first threshold and a second threshold by modifying the reference signal, wherein the first threshold is lower than the second threshold.

7. The method according to claim 6, wherein said modifying of the reference signal comprises:
increasing the reference signal if said digital estimation of the voltage signal across the battery is lower than the first threshold, and
decreasing the reference signal if said digital estimation of the voltage signal across the battery is higher than the second threshold.

8. The method according to claim 6, further comprising enabling the modifying of the reference signal only when a charging phase of the battery is operating in a constant voltage phase.

9. An integrated circuit, comprising:
circuitry formed in one chip of semiconductor material including:
an input supply terminal configured to receive a supply signal,
a battery terminal configured to be connected to a battery,
a supply switching circuit arranged in an electrical path between the battery terminal and the input supply terminal,
a control device configured to generate a control signal to control operation of the supply switching circuit,
a fuel gauge device configured to provide a digital estimation of a voltage signal across the battery,
wherein the control device generates the control signal in response to a difference between the digital estimation of the voltage signal across the battery and a reference signal, and
a correction device configured to modify said control signal generated by the control device if said digital estimation of the voltage signal across the battery is out of a value range between a first threshold and a second threshold by modifying the reference signal, wherein the first threshold is lower than the second threshold.

10. A battery charger, comprising:
an input supply terminal configured to receive a supply signal,
a battery terminal configured to be connected to a battery,
a supply switching circuit arranged in an electrical path between the battery terminal and the input supply terminal,
a fuel gauge device configured to provide a digital estimation of a voltage signal across the battery,
a control device configured to generate a control signal to control operation of the supply switching circuit,
a correction device configured to modify said control signal generated by the control device if said digital estimation of the voltage signal across the battery is out of a value range between a first threshold and a second threshold, wherein the first threshold is lower than the second threshold, and
an enabling circuit of the correction device configured to enable the correction device only when a charging phase of the battery is operating at a constant voltage phase, wherein the enabling circuit comprises a comparison circuit configured to compare the voltage across the battery with a programmed floating voltage level of the battery, and to emit a signal at an active logic state when the voltage across the battery is close to the programmed floating voltage level of the battery.

* * * * *